(12) United States Patent
Pettay

(10) Patent No.: US 8,255,939 B1
(45) Date of Patent: Aug. 28, 2012

(54) INTERACTIVE TELEVISION OFFER PRESENTATIONS

(75) Inventor: Mark J. Pettay, Omaha, NE (US)

(73) Assignee: West Corporation, Omaha, NE (US)

( * ) Notice: Subject to any disclaimer, the term of this patent is extended or adjusted under 35 U.S.C. 154(b) by 745 days.

(21) Appl. No.: 12/054,744

(22) Filed: Mar. 25, 2008

(51) Int. Cl.
*H04N 7/16* (2011.01)
(52) U.S. Cl. ............. 725/23; 725/14; 725/34; 725/45; 725/46; 705/26.81; 705/14.1; 705/300
(58) Field of Classification Search .................. None
See application file for complete search history.

(56) References Cited

U.S. PATENT DOCUMENTS

| | | | | |
|---|---|---|---|---|
| 6,282,713 | B1* | 8/2001 | Kitsukawa et al. | 725/36 |
| 2005/0144093 | A1* | 6/2005 | Kassan | 705/27 |
| 2006/0288367 | A1* | 12/2006 | Swix et al. | 725/46 |
| 2007/0079353 | A1* | 4/2007 | Boortz | 725/135 |
| 2007/0169143 | A1* | 7/2007 | Li | 725/23 |

\* cited by examiner

*Primary Examiner* — Dominic D Saltarelli
*Assistant Examiner* — Jason J Chung

(57) ABSTRACT

A method, a system, and computer readable medium comprising instructions for interactive television offer presentation are provided. The method comprises assigning a unique marketing key to a subscriber, storing the unique marketing key and information of the subscriber in a database, detecting a request from the subscriber comprising the unique marketing key, retrieving the information from the database based on the unique marketing key, and making at least one offer of a product or service to the subscriber based on the information.

4 Claims, 9 Drawing Sheets

INTERACTIVE TELEVISION OFFER PRESENTATIONS

FIELD OF THE DISCLOSURE

The present disclosure relates generally to interactive television offers. More particularly, the present disclosure provides a method, a system, and a computer readable medium comprising instructions for providing interactive television offers presentations to subscribers.

BACKGROUND OF THE DISCLOSURE

Currently, subscribers of television service enjoy many benefits of their services. These benefits include the ability to view program information, record favorite programs, review pre-recorded programs without interruption of commercials or advertisements, and shop for merchandise through a variety of shopping networks.

Although some entertainment providers allow subscribers to order merchandise or movies on demand, many of them make such offers only when the subscriber is viewing or recording the merchandise or movie in question. For example, when a subscriber saw a preview of a movie shown on the television, the provider may offer the subscriber an option to purchase the movie by using a remote control. While this type of offers interacts with the subscriber, it is subordinate to what the subscriber is watching at the time or recorded at a previous time. Thus, the offers are limited to a particular product or service the subscriber is viewing at a given time.

In addition, these offers are generally made to all subscribers who happen to be viewing the program at a given time. Thus, no distinction is made between offers to different subscribers in the same household. For example, a male subscriber in one household who is viewing a program relating to fitness and exercise may purchase a treadmill at a given time. A female subscriber in the same household may at a later time order a blouse over the shopping network. Currently, entertainment providers fail to distinguish between these subscribers for purpose of making future offers. Thus, entertainment providers only provide static and passive offers based on previous purchases. This leads to lost opportunities in marketing, because it fails to recognize the need of different subscribers for different variety of products or services.

Therefore, what is needed is a new method and apparatus for interactive television offers presentations that provide active and dynamic offers to subscribers. These offers not only based on what the subscribers are interested or viewing at a given time, but may be based on what the subscribers potentially are interested or have ordered previously in order to achieve better marketing objectives. In addition, these offers distinguish between different subscribers for marketing purposes and make offers based on these distinctions.

SUMMARY OF THE DISCLOSURE

A method for interactive television offer presentation is provider. In one embodiment, the method comprises assigning a unique marketing key to a subscriber, storing the unique marketing key and information of the subscriber in a database, detecting a request from the subscriber comprising the unique marketing key, retrieving the information from the database based on the unique marketing key, and making at least one offer of a product or service to the subscriber based on the information.

In an alternative embodiment, the method comprises detecting a request from a subscriber, determining if the request comprises a unique marketing key identifying at least one subscriber or at least one product or service, requesting an identifier from an entertainment provider if the request does not comprise a unique marketing key, sending the identifier to a Web server or a call center, retrieving information of the at least one subscriber or the at least one product or service, and offering making at least one offer of a product or service to the subscriber based on the information.

In another alternative embodiment, the method comprises identifying a television commercial watched by a subscriber, identifying a product or service of the television commercial, consulting a service provider for available product or service relating to the product or service of the television commercial, retrieving a commercial for the available product or service, and displaying the commercial for the available product or service to the subscriber.

In yet another alternative embodiment, a system for interactive television offer presentation is provided. The system comprises a television watched by a subscriber, an entertainment provider subscribed by the subscriber to display at least one television program or commercial on the television, a decision engine communicably coupled to the entertainment provider, a database communicably coupled to the decision engine and the entertainment provider, and a service provider providing at least one service or product to the subscriber.

The system further comprises a call center communicably coupled to the decision engine, a Web server communicably coupled to the decision engine, a telephone or a mobile device communicably coupled to the call center, and a data processing system communicable coupled to the Web server.

DETAILED DESCRIPTION OF THE INVENTION

Figure 1:
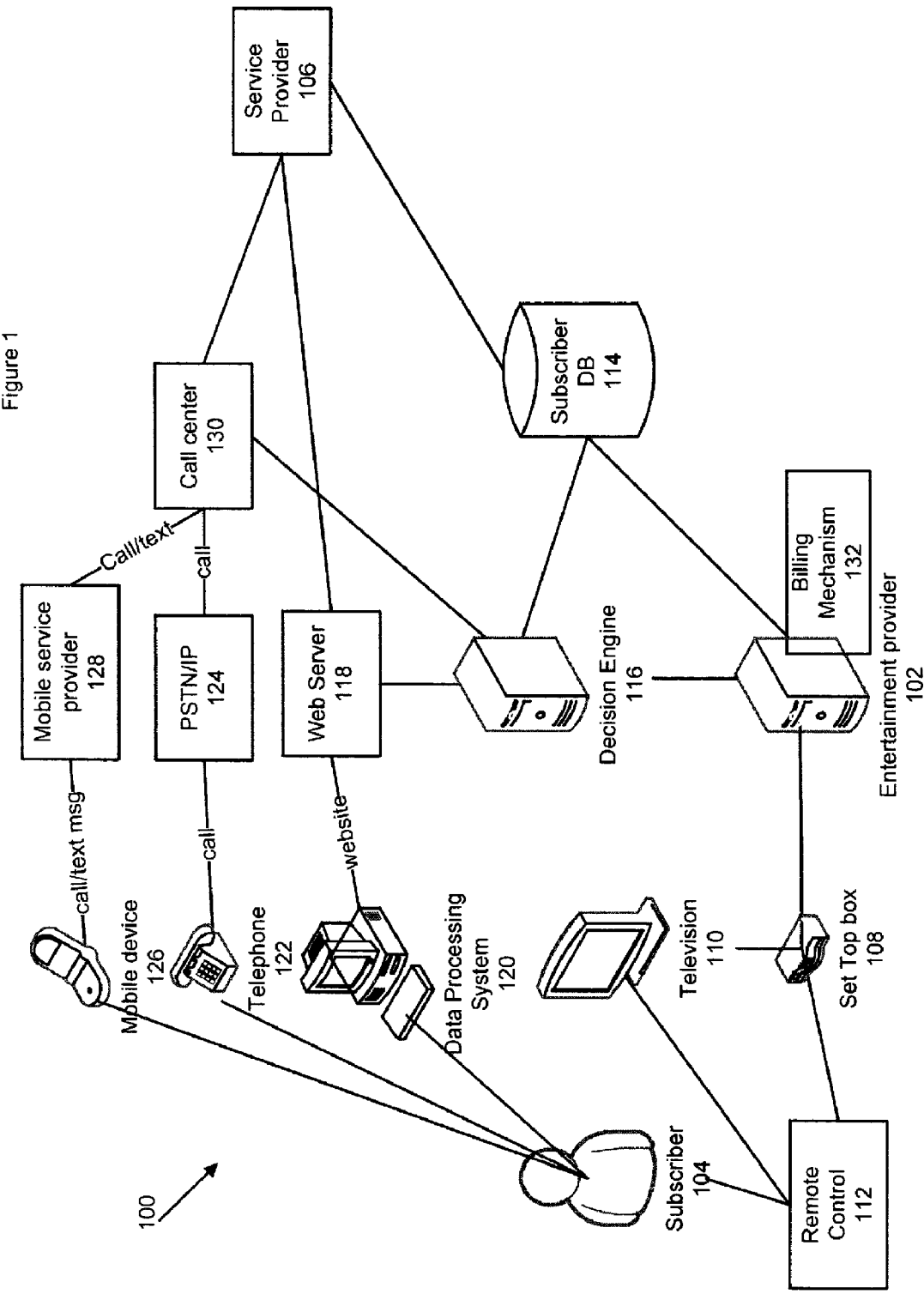
FIG. 1 depicts a diagram of a system for interactive television offer presentations in accordance with one embodiment of the present disclosure.

With reference to the figures and in particular with reference to FIG. 1, a diagram of a system for interactive television offer presentation is depicted in accordance with one embodiment of the present disclosure. Entertainment provider 102 provides a variety of services to subscriber 104, including television programs, movies, and on demand ordering of goods and services offered by service provider 106.

Generally, entertainment provider 102 provides these services by delivering information to a set top box 108. A set top box 108 may be a cable box, a satellite receiver, a digital video recorder or other types of device capable of sending and receiving audio/video signals and digital data. Set top box 108 delivers audio/video signals to display programs on television 110 that is viewed by subscriber 104. In addition to television programs, set top box 108 also delivers to television 110 offers made to subscriber 104 by entertainment provider 102 and service provider 106. For example, entertainment provider 102 may offer a movie for purchase by subscriber 104 by displaying a preview of the movie and an option to purchase the movie on television 110. If subscriber 104 is interested in purchasing the movie, subscriber 104 may select the option to purchase the movie using remote control 112. Remote control 112 in response sends the selection by subscriber 104 either directly to set top box 108 or indirect to set top box 108 via television 110. Once the selection is received, set top box 108 sends the purchase to entertainment provider 102.

In response to the purchase, entertainment provider 102 sends the selected movie for viewing by subscriber 104 via set top box 108. Entertainment provider 102 comprises a billing mechanism 132, which calculates a bill for the subscriber for the entertainment services provided. In addition, entertainment provider 102 stores information associated with subscriber 104 in subscriber database 114. This information may include the subscriber's name, address, phone number, occupation, income level, family members, preferences, purchased items, advertised items, recorded programs, other selections by subscriber 104. While entertainment provider 102 may offer a variety of services to subscriber 104 via set top box 108 and television 110, these offers are often passive and static offers, which are made only in response to the subscriber 104 viewing a particular program or selecting a service at a given time. In addition, offers are often made regardless of which subscriber in the household is viewing the program at the given time.

Aspects of the present disclosure provide interactive television offer presentations that are dynamic and active to subscriber 104. In one aspect of the present disclosure, a decision engine 116 is provided which makes decision on how to make offer to subscriber 104 that best serves marketing objectives of service providers 106. In one embodiment, decision engine 116 makes decision on what products or services to offer subscriber 104 based on information stored in subscriber database 114. In this embodiment, a subscriber marketing key is assigned to each unique subscriber within a household.

When a subscriber initiates a request for an action with the set top box 108, for example, to place an order or to view or record a program, the unique subscriber marketing key is attached to the request and delivered to entertainment provider 102. In turn, the entertainer provider 102 store the subscriber marketing key along with information associated with the request in subscriber database. The information may include time of the request, product or service requested, and type of request (via set top box or personal computer). The information may include information about the product or service requested that is retrieved from service provider 106, such as price of the product, sizes, type of the product, etc. By storing the subscriber marketing key and information about product or service requested, decision engine 116 may make marketing offers that better suit the same subscriber's needs.

Because a subscriber may order one or more products and services, a product/service key is uniquely assigned to each product/service that the subscriber requested. The unique product/service key may be stored along with the unique subscriber marketing key in subscriber database 114 when the particular product/service is requested. In this way, decision engine 116 may make marketing offers of a particular product/service that better suit the subscriber's needs.

Sometimes, subscriber 104 may decide to make a request for a product or service after viewing a program or commercial on television 110. For example, subscriber 104 may respond to an offer by visiting a Website in a Web server 118 using a data processing system 120. Data processing system 120 may be a personal computer, a laptop computer, or other device capable of sending information to and receiving information from Web server 118 over the Internet.

Alternatively, subscriber 104 may place a request for products or services over a telephone 122 or mobile device 126, for example, by dialing a 1-800 number. The request is routed via a public service telephone network 124 or a mobile service provider 128 to a call center 130. Telephone 122 may be a traditional telephone or a voice over Internet Protocol phone that forwards the request over an IP network 124. In addition, subscriber 104 may respond to an offer by sending a text message using a mobile device 126.

When the request is sent by subscriber 104, the unique subscriber marketing key and/or the unique product/service key may be appended to the request. Upon receiving the request, Web server 118 or call center 130 forwards the request to decision engine 116. Decision engine 116 examines the request and retrieves information associated with subscriber 104 based on the unique key from subscriber database 114 including products and services that are requested by subscriber 104 and other information associated with subscriber 104. Based on the information retrieved from subscriber database 114, decision engine 116 makes a decision on what other products and services to offer subscriber 104 by consulting with service provider 106. In this way, better marketing offers can be made to subscriber 104 based on information associated with a particular subscriber or product/service. If a purchase is made by the subscriber based on the offer, the cost for such purchase is added to the existing bill calculated by billing mechanism 132 in entertainment provider 102. Thus, the billing total for the entertainment provider will include any purchase made by the subscriber 104 via set top box 108.

The transfer of information between the set top box 108, entertainment provider 102, decision engine 116, data processing system 120, Web server 118, call center 130, and subscriber database 114 occurs via at least one of a wireless protocol, a wired protocol and the combination of the wireless protocol and the wired protocol. The steps performed in this figure are performed by software, hardware, firmware, and/or the combination of software, hardware, and/or firmware.

Figure 2:
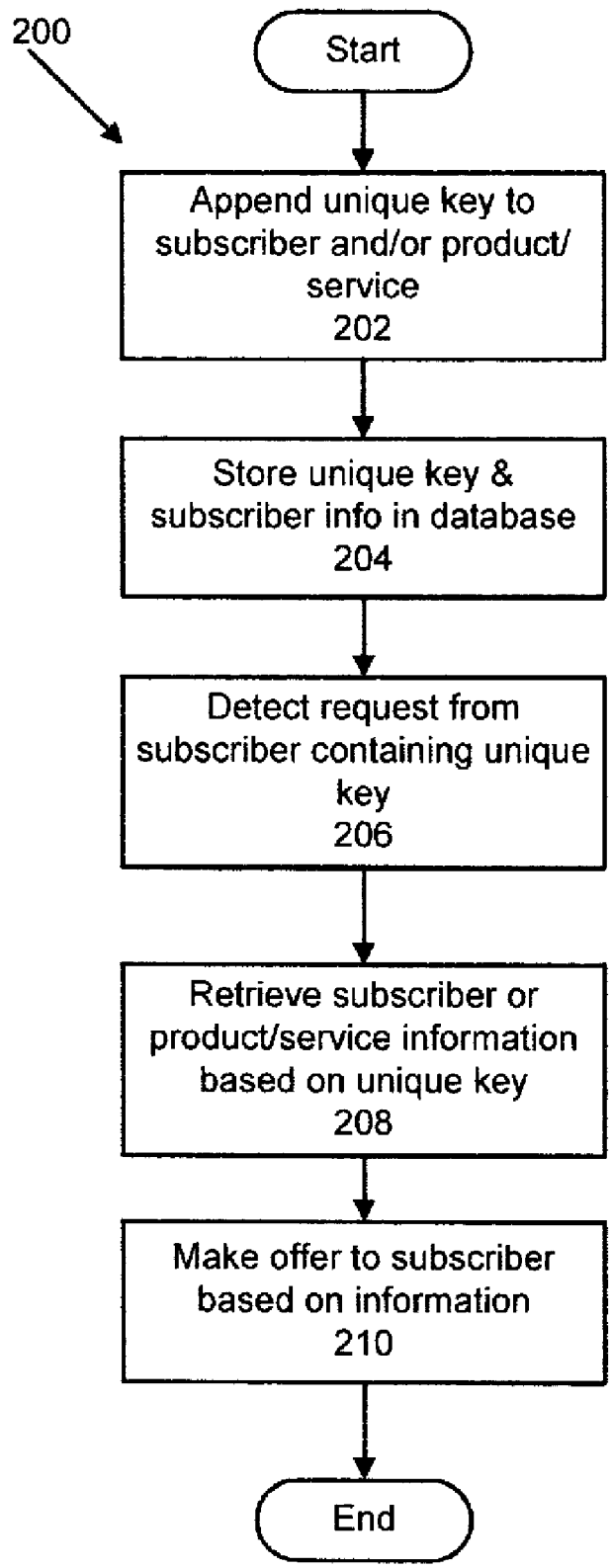
FIG. 2 depicts a flowchart of a process for interactive television offer presentation in accordance with one embodiment of the present disclosure.

Referring to FIG. 2, a flowchart of a process for interactive television offer presentation is depicted in accordance with one embodiment of the present disclosure. Process 200 may be implemented in a computer readable medium comprising instructions executing within decision engine 116 or entertainment provider 102. Process 200 begins at step 202 to append a unique key to the subscriber or product/service when a request is sent by a particular subscriber for a particular product/service. Process 200 then continues to step 204 to store information collected from the subscriber along with the unique key in a subscriber database. The information collected from the subscriber may include the product/service requested, the time of the request, subscriber's name, address, phone number, preferences, etc. For example, when a subscriber initiates a request to order a movie using set top box, information about the type and the name of the requested movie is stored in the subscriber database.

Process 200 then continues to step 206 to detect a request from the subscriber containing the unique subscriber or product/service key identifying the particular subscriber and/or product/service. Process 200 then continues to step 208 to retrieve information about the subscriber and/or product/service from the subscriber database based on the unique key. Once the information is retrieve, process 200 then completes at step 210 to make offer to the subscriber based on the retrieved information.

Figure 3:
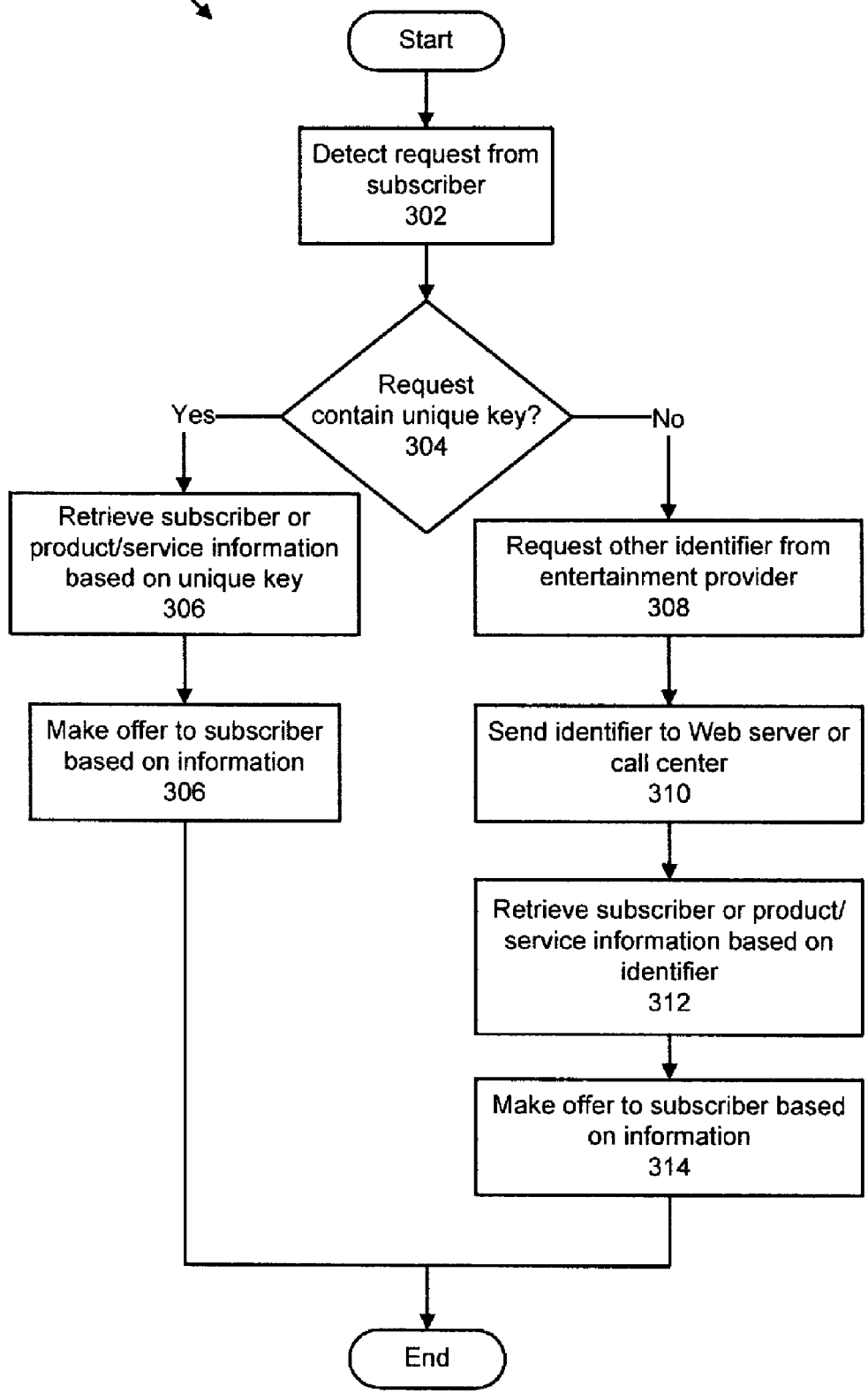
FIG. 3 depicts a flowchart of a process for interactive television offer presentation in accordance with an alternative embodiment of the present disclosure.

In the event that no unique subscriber marketing or product/service key is attached to a request sent from the subscriber, decision engine may retrieve subscriber information from the subscriber database and returns the request with information associated with the subscriber to entertainment provider 102, Web server 116, or call center 130. Referring to FIG. 3, a flowchart of a process for interactive television offer presentation is depicted in accordance with an alternative embodiment of the present disclosure. Process 300 may be implemented in a computer readable medium comprising instructions executing within decision engine 116 or entertainment provider 102.

Process 300 begins at step 302 to detect a request from a subscriber. In one embodiment, the request may be received by a Web server or call center. Process 300 then continues to step 304 to determine if the request contains a unique subscriber or product/service key. If a unique subscriber or product/service key is contained within the request, process 300 continues to step 306 to retrieve subscriber and/or product/service information based on the unique key from subscriber database and to step 308 to make offer to subscriber based on the information retrieved from the database. However, if the request does not contain a unique subscriber and/or product/service key, process 300 continues to step 308 to request other information identifying the subscriber from the entertainment provider, for example, what product the subscriber is ordering, the subscriber's automatic name identifier (ANI), a text, or a URL, etc. Process 300 then continues to step 310 to send the identifying information to the Web server or call center. Process 300 continues to step 312 to retrieve subscriber and/or product/service information based on the identifying information from the subscriber database. Process 300 completes at step 314 to make offer to subscriber based on the information retrieved.

Figure 4:
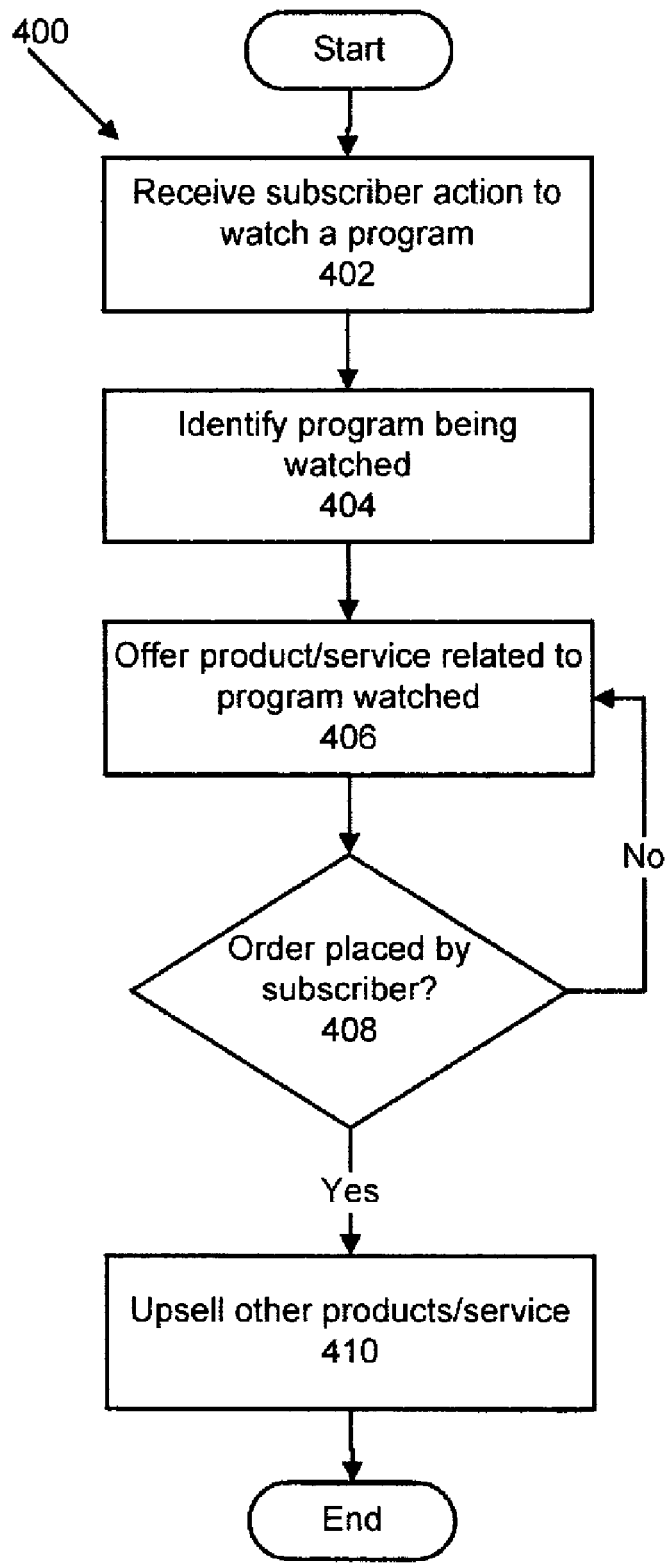
FIG. 4 depicts a flowchart of a process for making offer to subscriber based on information from subscriber database in accordance with one embodiment of the present disclosure.

To make offer that best serves the objectives of service providers, decision engine first identifies potential actions that a particular subscriber have taken or will take in the future. To identify potential actions that a particular subscriber have taken or will take in the future, decision engine applies a variety of techniques in predicting subscriber actions and making offers accordingly. Referring to FIG. 4, a flowchart of a process for making offer to subscriber based on information from subscriber database is depicted in accordance with one embodiment of the present disclosure. Process 400 may be implemented in a computer readable medium comprising instructions executing within decision engine 116 or entertainment provider 102.

Process 400 begins at step 402 to receive a subscriber action to watch a program on television. Process 400 then continues to step 404 to identify the program being watched the subscriber. For example, entertainment provider may determine that the subscriber requests to watch a program relating to exercise and fitness. Process 400 then continues to step 406 to offer a product/service related to the program being watched by the subscriber. For example, a product related to a program about exercise and fitness may be a treadmill or exercise bike, or other exercise apparels. More details regarding identifying what product/service related to the program being watched are discussed with reference to FIG. 5 below.

Process 400 then continues to step 408 to determine if an order of product/service is placed by the subscriber in response to the offer made in step 406. If no order is placed by the subscriber, process 400 returns to step 406 to continue offering products relating to the program being watched. In this case, the unique product/service key may be used to determine whether the product/service has been offered previously. If the product/service has been offered previously, other product/service may be offered.

If an order is placed by the subscriber at step 408, process 400 continues to step 410 to up sell other products and services to subscriber. For example, travel services may be offered to the subscriber based on the program about exercise and fitness being watched. More details regarding identifying what product/service to up sell are discussed with reference to FIG. 6 below.

Figure 5:
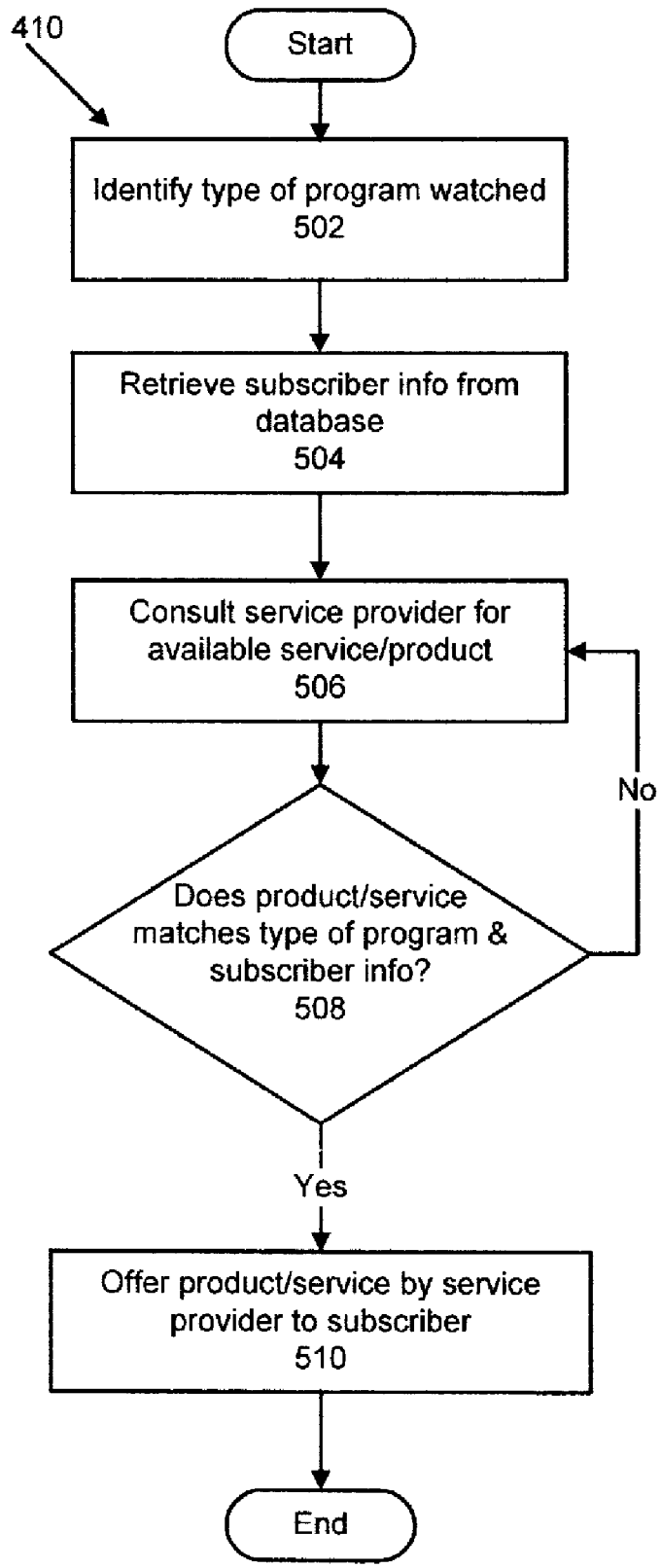
FIG. 5 depicts a flowchart of a process for identifying what product/service related to the program being watched in accordance with one embodiment of the present disclosure.

Referring to FIG. 5, a flowchart of a process for identifying what product/service related to the program being watched is depicted in accordance with one embodiment of the present disclosure. Process 406 may be implemented in a computer readable medium comprising instructions executing within decision engine 116. Process 406 begins at step 502 to determine the type of program being watched by the subscriber. Process 500 then continues to step 504 to retrieve subscriber information from the subscriber database. For example, information about the subscriber's preference, order history, income level, and other information relevant to matching a product/service to the subscriber may be retrieved.

Process 500 then continues to step 506 to consult service providers for available product or service. Process 500 then continues to step 508 to determine if the product/service available from the service provider matches the type of program being watched and fits within the subscriber information, such as the subscriber's income level. If the product/service available does not match the type of program and the subscriber information, process 500 returns to step 506 to consult another service provider or the same service provider for other products or services available. If product/service available matches the type of program and the subscriber information, process 500 continues to step 510 to offer the product/service by the service provider to the subscriber.

Figure 6:
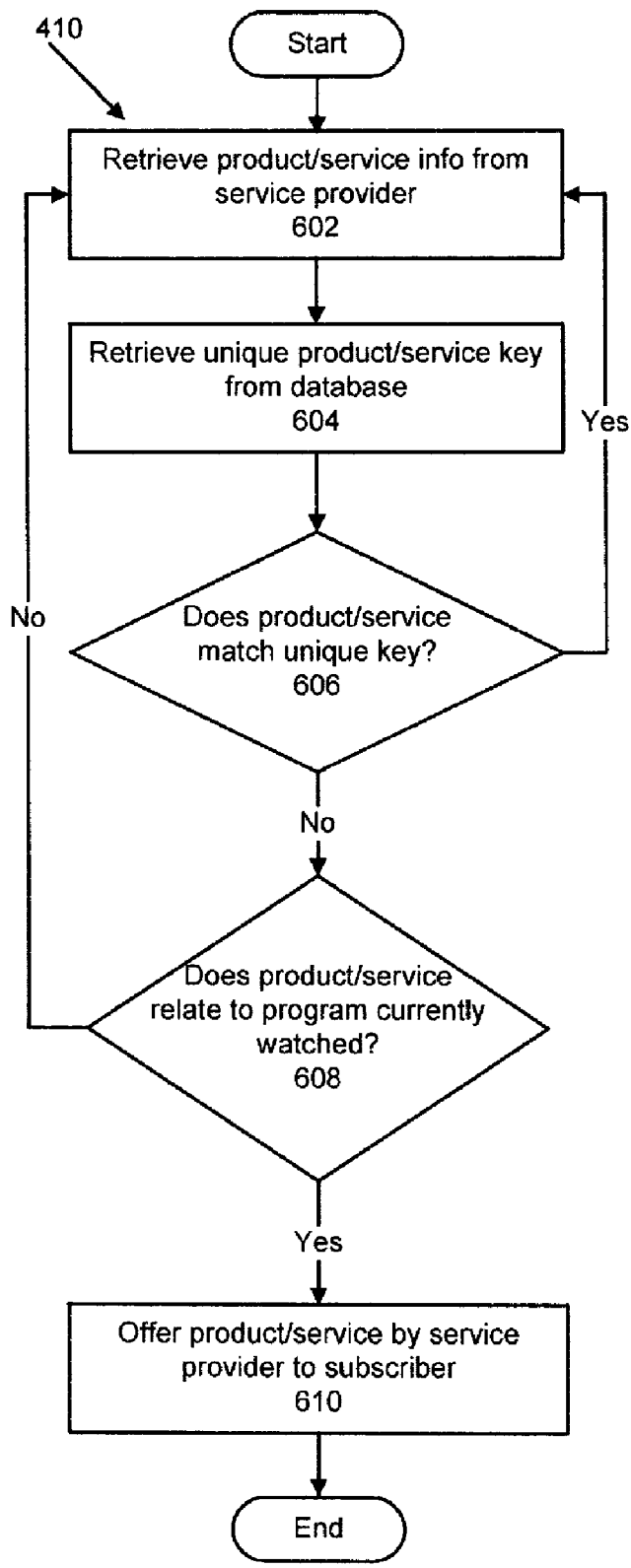
FIG. 6 depicts a flowchart of a process for identifying what product/service to up sell in accordance with one embodiment of the present disclosure.

Referring to FIG. 6, a flowchart of a process for identifying what product/service to up sell is depicted in accordance with one embodiment of the present disclosure. Process 410 may be implemented in a computer readable medium comprising instructions executing within decision engine 116. Process 410 begins at step 602 to retrieve product or service information from the service provider.

Process 410 then continues to step 604 to retrieve the unique service/product key stored in the subscriber database identifying products or services that have been previously ordered by the subscriber. Process 410 then continues to step 606 to determine if the product/service available from the service provider matches the unique product/service key. If the product/service available matches the unique product/service key, this means that the product/service has been previously ordered by the service provider to this subscriber and another product/service needs to be identified for up sell.

In this case, process 410 returns to step 602 to identify other product/service from the service provider.

If the product/service available from the service provider does not match the unique product/service key at step 606, this means that the product/service has not been previously offered to the subscriber and that the product/service may be up sold to the subscriber. In this case, process 410 continues to step 608 to determine if the product/service from the service provider relates to the television program currently being watched by the subscriber. If the product/service relates to the television program currently being watched by the subscriber, process 410 completes at step 610 to offer this product/service to the subscriber for up sell purposes.

Figure 7:
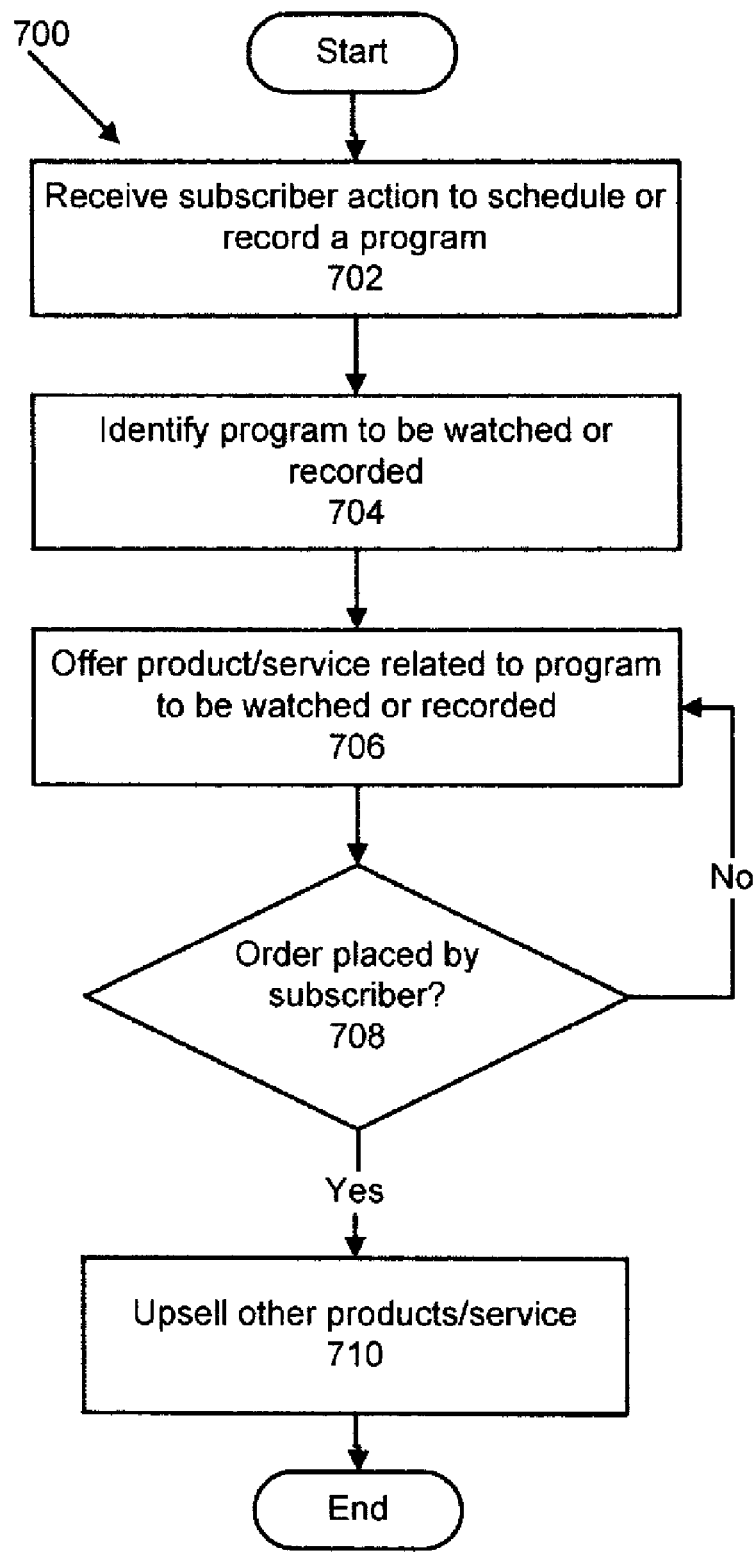
FIG. 7 depicts a flowchart of a process for making offer to subscriber based on information from subscriber database in accordance with an alternative embodiment of the present disclosure.

In addition to programs being watched by the subscriber, decision engine may make decision on what product/service to offer subscriber based on what program the subscriber will be watching or to be recorded. Referring to FIG. 7, a flowchart of a process for making offer to subscriber based on information from subscriber database is depicted in accordance with an alternative embodiment of the present disclosure. Process 700 may be implemented in a computer readable medium comprising instructions executing within decision engine 116 or entertainment provider 102.

Process 700 begins at step 702 to receive a subscriber action to schedule or record a program on television. Process 700 then continues to step 704 to identify the program to be watched or recorded by the subscriber. Process 700 then continues to step 706 to offer a product/service related to the program to be watched or recorded by the subscriber. More details regarding identifying what product/service related to the program being watched are discussed with reference to FIG. 5 above.

Process 700 then continues to step 708 to determine if an order of product/service is placed by the subscriber in response to the offer made in step 706. If no order is placed by the subscriber, process 700 returns to step 706 to continue offering products relating to the program being watched. In this case, the unique product/service key may be used to determine whether the product/service has been offered previously. If the product/service has been offered previously, other product/service may be offered.

If an order is placed by the subscriber at step 708, process 700 continues to step 710 to up sell other products and services to subscriber. For example, travel services may be offered to the subscriber based on the program about exercise and fitness being watched. More details regarding identifying what product/service to up sell are discussed with reference to FIG. 6 above.

Alternatively to programs being watched or to be watched or recorded, decision engine may make decision on what product/service to offer subscriber based on what commercial the subscriber is watching or to be watched. For example, a subscriber may be watching a commercial for a cold medicine offered by service provider A. Decision engine may consult product/service offered by service provider B relating to cold medicine and make such offer to subscriber based on the subscriber information. This decision may be made before the next commercial is displayed on television, such that entertainment provider may line up a cold medicine commercial from service provider B to be displayed on television before the commercial of cold medicine by service provider A is finished. In this way, dynamic and active offers may be made to the subscriber based on what commercial the subscriber is watching at real-time.

Figure 8:
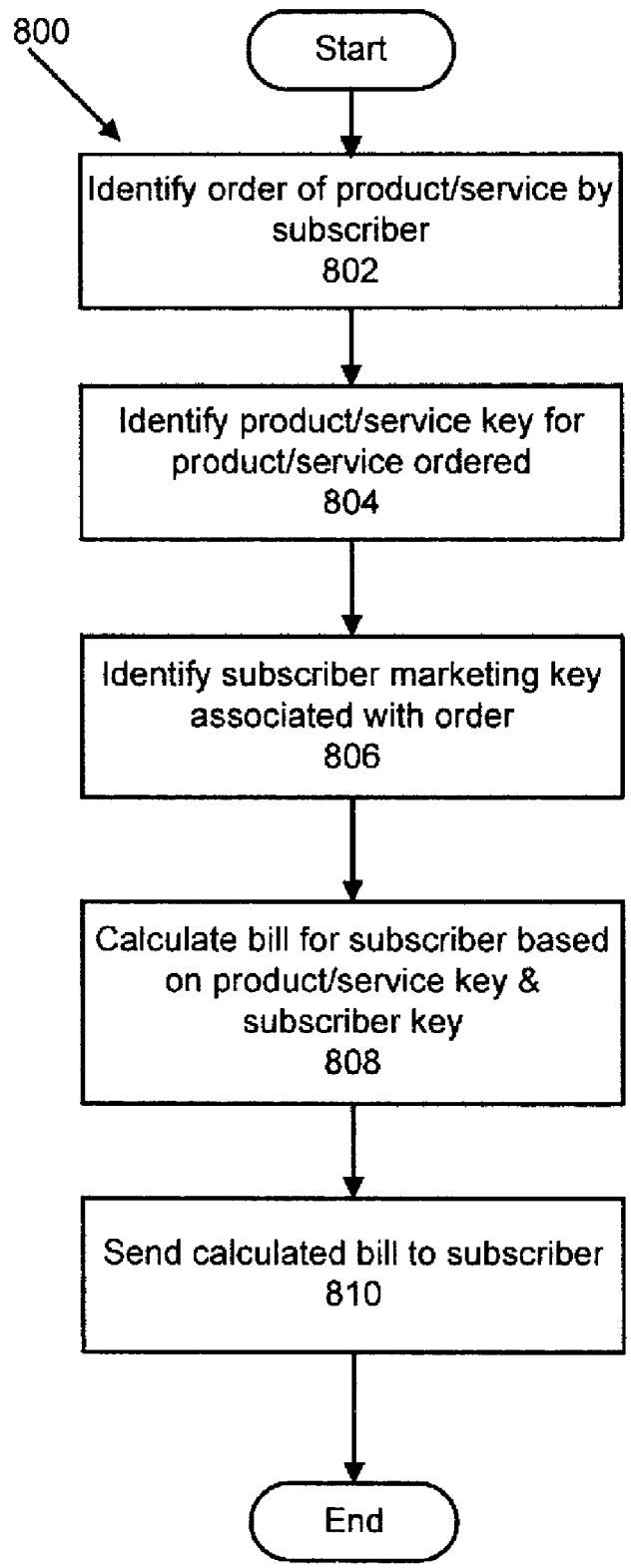
FIG. 8 depicts a flowchart of a process for billing subscribers for product/service ordered based on unique subscriber marketing key in accordance with one embodiment of the present disclosure.

In addition to making dynamic and active offers to subscribers, another aspect of the present disclosure may bill the subscriber for product/service ordered based on the subscriber marketing key. Referring to FIG. 8, a flowchart of a process for billing subscribers for product/service ordered based on unique subscriber marketing key is depicted in accordance with one embodiment of the present disclosure. Process 800 may be implemented in a computer readable medium comprising instructions executing within entertainment provider 102.

Process 800 begins at step 802 to identify an order of product/service by the subscriber. For example, entertainment provider may retrieve from subscriber database a list of orders placed by the subscriber using set top box. Process 800 then continues to step 804 identify a unique product/service key for the product/service ordered by the subscriber. The unique product/service key may be retrieved from the subscriber database or from the request sent by the subscriber at real-time. Process 800 then continues to step 806 to identify a unique subscriber marketing key associated with the order. The unique subscriber marketing key may be retrieved from the subscriber database or from the request sent by the subscriber at real-time. Process 800 then continues to step 808 to calculate a bill for the subscriber based on the unique product/service key and the unique subscriber marketing key. Process 800 then completes the process at step 810 to send the bill to the subscriber identified by the unique subscriber marketing key.

In addition to calculating a bill and sending the bill to the subscriber, one aspect of the present disclosure leverages existing billing mechanism 132 of entertainment provider 104 to include a total from any purchase made by the subscriber from offers using the unique subscriber marketing key and/or the unique product/service key.

Figure 9:
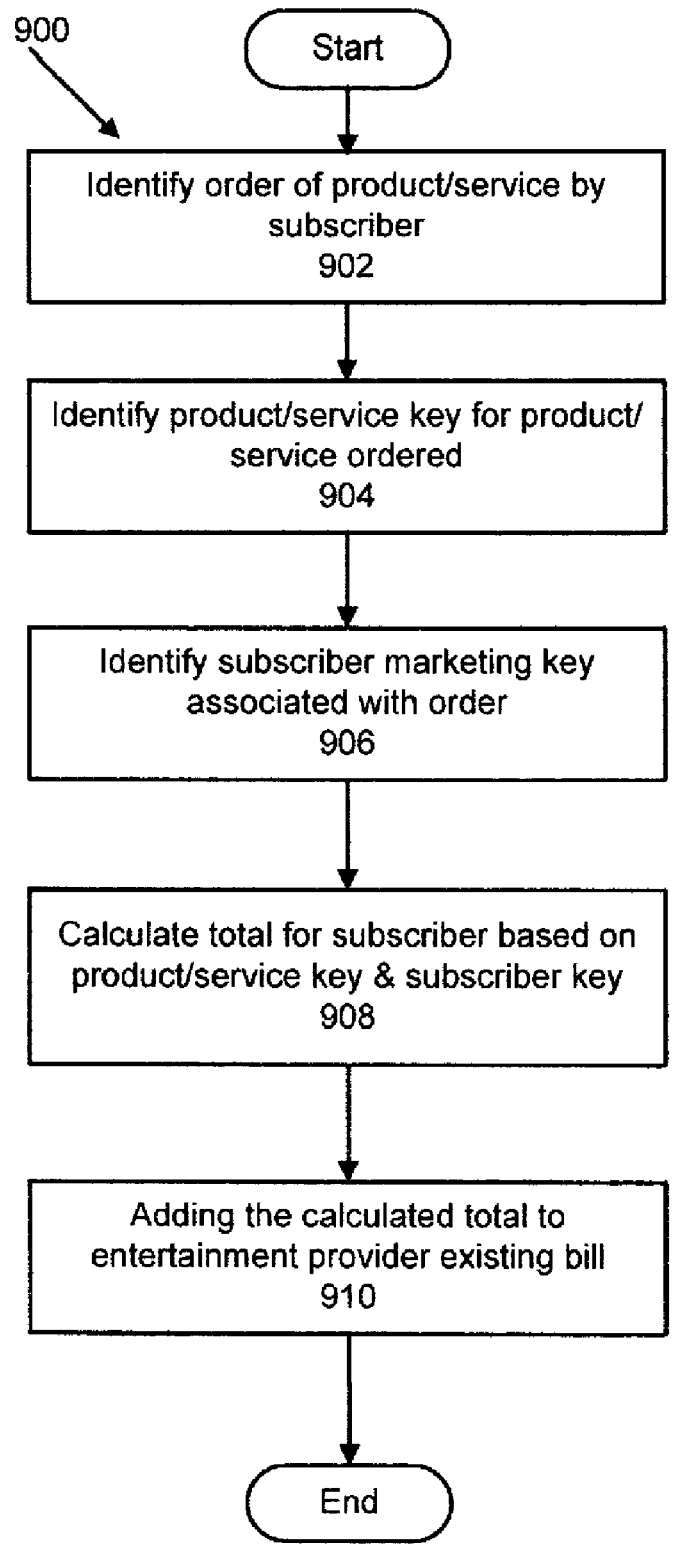
FIG. 9 depicts a flowchart of a process for identifying an order of product/service by the subscriber according to an embodiment of the present disclosure.

Referring to FIG. 9, a flowchart of a process for billing subscribers for product/service ordered based on unique subscriber marketing key is depicted in accordance with one embodiment of the present disclosure. Process 900 may be implemented in a computer readable medium comprising instructions executing within entertainment provider 102.

Process 900 begins at step 902 to identify an order of product/service by the subscriber. For example, entertainment provider may retrieve from subscriber database a list of orders placed by the subscriber using set top box. Process 900 then continues to step 904 identify a unique product/service key for the product/service ordered by the subscriber. The unique product/service key may be retrieved from the subscriber database or from the request sent by the subscriber at real-time. Process 900 then continues to step 906 to identify a unique subscriber marketing key associated with the order. The unique subscriber marketing key may be retrieved from the subscriber database or from the request sent by the subscriber at real-time. Process 900 then continues to step 908 to calculate a total for the subscriber of any purchase made based on the unique product/service key and the unique subscriber marketing key. Process 900 then completes the process at step 910 to add the calculated total to the entertainment provider's existing bill for the subscriber identified by the unique subscriber marketing key.

In summary, aspects of the present disclosure provide interactive television offer presentations to make dynamic and active offers to subscribers of products or services. In one embodiment, a decision engine is provided to make decision on what products or services to offer the subscribers based on information stored in a subscriber database. The decision may be made based on a unique subscriber marketing key or a unique product/service key. In the event that no subscriber marketing key is available, the decision engine requests other identifier from the entertainment provider and retrieves subscriber information based on the other identifier before making decisions on what products or services to offer. When making decisions on what products or services to offer, the decision engine identifies a programs or a commercial currently being watched or will be watched by the subscriber. Furthermore, the entertainment provider may utilize the unique subscriber marketing key and unique product/service key to bill the subscriber either based on information in the database or at real-time.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A non-transitory computer readable storage medium comprising instructions executable in at least one processor for interactive television offer presentation comprising:
   assigning a unique marketing key to a subscriber;
   storing the unique marketing key and information of the subscriber in a database;
   detecting a request from the subscriber comprising the unique marketing key attached to the request;
   retrieving the information from the database based on the unique marketing key;
   retrieving the information from the database by a decision engine when no unique marketing key is attached to the request sent from the subscriber;
   returning the request by the decision engine with the information;
   making at least one offer of a product or service to the subscriber based on the information, wherein making at least one offer to the subscriber based on the information comprises:
      receiving an action from the subscriber to watch a television program;
      identifying the television program watched by the subscriber; and
      offering at least one product or service related to the television program;
   determining if at least one order is placed by the subscriber for the at least one product or service;
   upselling another product or service to the subscriber if at least one order is placed by the subscriber, wherein upselling said another product or service comprises:
      identifying a type of the television program watched by the subscriber;
      retrieving the information of the subscriber from the database;
      consulting a service provider for an available another product or service;
      retrieving said available another product or service from a service provider;
      retrieving a unique product or service key from the database identifying a particular another product or service; and
      determining if said available another product or service matches the unique product or service key;
   determining if said available another product or service matches the type of television program watched by the subscriber;
   offering said available another product or service to the subscriber if said available another product or service matches the type of television program watched by the subscriber;
   determining if said available another product or service is related to the television program watched by the subscriber; and
   offering said available another product or service to the subscriber if said available another product or service is related to the television program watched by the subscriber.

2. The non-transitory computer readable storage medium according to claim 1, wherein making offer to the subscriber based on the information comprises:
   receiving an action from the subscriber to schedule or record a television program;
   identifying the television to be watched or recorded; and
   offering at least one product or service related to the television program to be watched or recorded.

3. The non-transitory computer readable storage medium according to claim 2, further comprising:
   determining if an order of the at least one product or service is placed by the subscriber; and
   upselling another product or service to the subscriber if the order of the at least one product or service is placed by the subscriber.

4. The non-transitory computer readable storage medium according to claim 1, further comprising:
   identifying an order of a product or service by the subscriber;
   identifying a unique product or service key for the product or service ordered;
   identifying the unique marketing key associated with the order;
   calculating a bill of the order for the subscriber based on the unique product or service key and the unique marketing key; and
   sending the bill to the subscriber.

* * * * *